US006698262B2

(12) United States Patent
Wittwer

(10) Patent No.: US 6,698,262 B2
(45) Date of Patent: Mar. 2, 2004

(54) ACCESS SYSTEM FOR A VEHICLE

(75) Inventor: Reinhard Wittwer, Heiligenhaus (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 10/204,564

(22) PCT Filed: Mar. 1, 2001

(86) PCT No.: PCT/EP01/02298

§ 371 (c)(1), (2), (4) Date: Aug. 21, 2002

(87) PCT Pub. No.: WO01/75252

PCT Pub. Date: Oct. 11, 2001

(65) Prior Publication Data

US 2003/0019261 A1 Jan. 30, 2003

(30) Foreign Application Priority Data

Mar. 30, 2000 (DE) ........................................ 100 15 887

(51) Int. Cl.[7] ............................................... B60R 25/02

(52) U.S. Cl. ........................ 70/208; 70/237; 292/336.3; 292/DIG. 31

(58) Field of Search .................. 70/208, 237, DIG. 31; 292/336.3, DIG. 30, DIG. 31

(56) References Cited

U.S. PATENT DOCUMENTS

| | | | | | |
|---|---|---|---|---|---|
| 3,993,338 | A | * | 11/1976 | Cherbourg et al. | 292/336.3 |
| 4,834,433 | A | * | 5/1989 | Keller | 292/336.3 |
| 4,889,373 | A | * | 12/1989 | Ward et al. | 292/336.3 |
| 5,560,659 | A | * | 10/1996 | Dault | 292/336.3 |
| 5,632,516 | A | * | 5/1997 | Schwab | 292/336.3 |
| 5,743,575 | A | | 4/1998 | McFarland | 292/336.3 |
| 6,067,869 | A | * | 5/2000 | Chilla et al. | 292/336.3 X |
| 6,099,052 | A | * | 8/2000 | Spitzley | 292/336.3 |
| 6,196,599 | B1 | * | 3/2001 | D'Hooge | 292/165 |

FOREIGN PATENT DOCUMENTS

| | | |
|---|---|---|
| DE | 3835265 | 4/1990 |
| DE | 197 40 827 A1 | 3/1999 |
| DE | 298 04 105 U1 | 8/1999 |
| EP | 0589158 | 3/1994 |
| EP | 1099810 | 5/2001 |

* cited by examiner

*Primary Examiner*—Suzanne Dino Barrett
(74) *Attorney, Agent, or Firm*—Friedrich Kueffner

(57) ABSTRACT

The invention relates to an access system in which an access authorization that can be disposed of outside of the vehicle communicates with identification means located inside the vehicle. If the identification means respond, control means which operate a door lock (40) from a door handle (10) are transferred out of their inoperative position into an operative position. To this end, the door handle (10) can move between three different positions (10.1, 10.2). In the first position, the door handle (10) is located in a retracted position (10.1), which cannot be grasped by the human hand, but rather is streamlined. Only when the door handle (10) is in a protruding extended position (10.2) is the latter possible. The door handle is then manually displaced into a third protracted position in which the door lock (40) is opened. According to the invention, this mode of operation is ensured by an actuator (30) configured, for example, as an eccentric.

15 Claims, 6 Drawing Sheets

ACCESS SYSTEM FOR A VEHICLE

The invention pertains to an access system of the type indicated in the introductory clause of claim 1. The door handle is first moved by a motorized actuator between a first or retracted position, in which it cannot be gripped effectively, to a second or extended position, in which the human hand is able to grip the handle properly. In the retracted position, the door lock is closed, which is also true for the second, extended position. Starting from that position, however, the handle can be moved further by hand into a final position, in which the door lock can be opened by mechanical control means.

In the known access system of this type (DE 197 40 827 A1), the actuator consists of a drive element, which can be moved between three different pivot positions by actuation of a lock cylinder or by a motor; a drawbolt projects from one side of this actuate, a pushbolt from the other. The handle comprises a cover, which, in the first or retracted position of the handle, is flush with the exterior skin of the door to prevent the intrusion of dust and moisture into the handle recess. In this first, retracted, position, the drawbolt grips under the linkage of the door handle and prevents the door from being opened in an emergency, e.g., when the electronic circuitry fails. In the retracted position, furthermore, the cover, which is flush with the door, cannot be gripped effectively to make it possible for the door to be opened in an emergency.

In another known access system of this type (U.S. Pat. No. 5,873,274), the door handle is spring-loaded to move outward. In its retracted position, a locking bolt engages positively in openings in the handle and holds it in the retracted position. When a key is used to actuate the lock cylinder, the bolt releases the handle, as a result of which the spring can move the handle into its extended position. The return of the handle from the spring-loaded extended position to the retracted position must be accomplished manually. Because of this manual return, the handle cannot be operated remotely.

In an access system of a different type (DE 198 16 603 C1), it is known that the handle can be gripped by hand while it is in its first handle position and moved manually to a second handle position, where normally a blocking element prevents further movement to the third handle position. The blocking element is removed only after the identification means in the vehicle accepts the access authorization; as a result, the handle can then be moved into its third position. In this known access system, it is necessary for it to be possible for the human hand to grip the handle reliably in its first handle position. For this purpose, there must be sufficient room to bring the hand to the handle and/or to the adjacent exterior door panel. This design causes an undesirable increase in the amount of drag on the vehicle when it is in motion. In addition, the state of the art just described involves a keyless access system, in which the failure of the electronic circuitry cannot be tolerated. This latter aspect limits the range of applications of this known access system. Because the handle is spring-loaded and thus is always trying to return to the first handle position, it would be possible in the known access system for the hand to be caught if the person were to hold onto the handle too long. But if the handle is released before that, e.g., while it is in the outermost, third handle position, very unpleasant noise is produced as the handle moves back under the force of the spring into its first handle position.

The invention is therefore based on the task of developing an access system which is streamlined when in the retracted position, which can also be used in the case of door lock controlled by a lock motor, and which can be operated reliably even in an emergency, when the electronic circuitry fails. This is accomplished according to the invention by the measures to which the following special meaning attaches:

A cam is used as the actuator, on which the door handle or its linkage is supported; in the rest position, the linkage is supported nonpositively on the point of minimum eccentricity of the cam, and when in the working position it is supported on the point of maximum eccentricity. The profile of the cam forms an adjustable stop for the door handle or its linkage. For this reason, the invention can also be used in an access system in which the door lock is controlled by a lock motor. That is, starting from the second or extended position, the door handle or its linkage can be lifted away from the maximum eccentricity of the cam and moved into a fourth or pulled-out position, which is between the second or extended position and the third or final position. In the pulled-out position, the lock motor is rendered operative.

The invention can also be applied just as effectively in an emergency, when the electronic circuitry fails, as it can in an access system without a lock motor. In this case, the previously mentioned fourth or pulled-out position is simply omitted, and the door handle or its linkage can be lifted manually away from the point of minimum or maximum eccentricity and moved to the third or final position, in which the door lock is opened via mechanical control means.

In an access system which controls the door lock by way of a lock motor, there no danger that the hand will be caught when the handle is moved back from its fourth or pulled-out position to its second or extended position. That is, the further return of the handle to its first or retracted position occurs electrically, where the cam is turned back with respect to the handle or its linkage from its point of maximum eccentricity to its point of minimum eccentricity. Even though force may be exerted on it, the door handle returns to its retracted position with practically no noise at all.

Additional measures and advantages of the invention can be derived from the other subclaims, from the description, and from the drawings:

Figure 1:
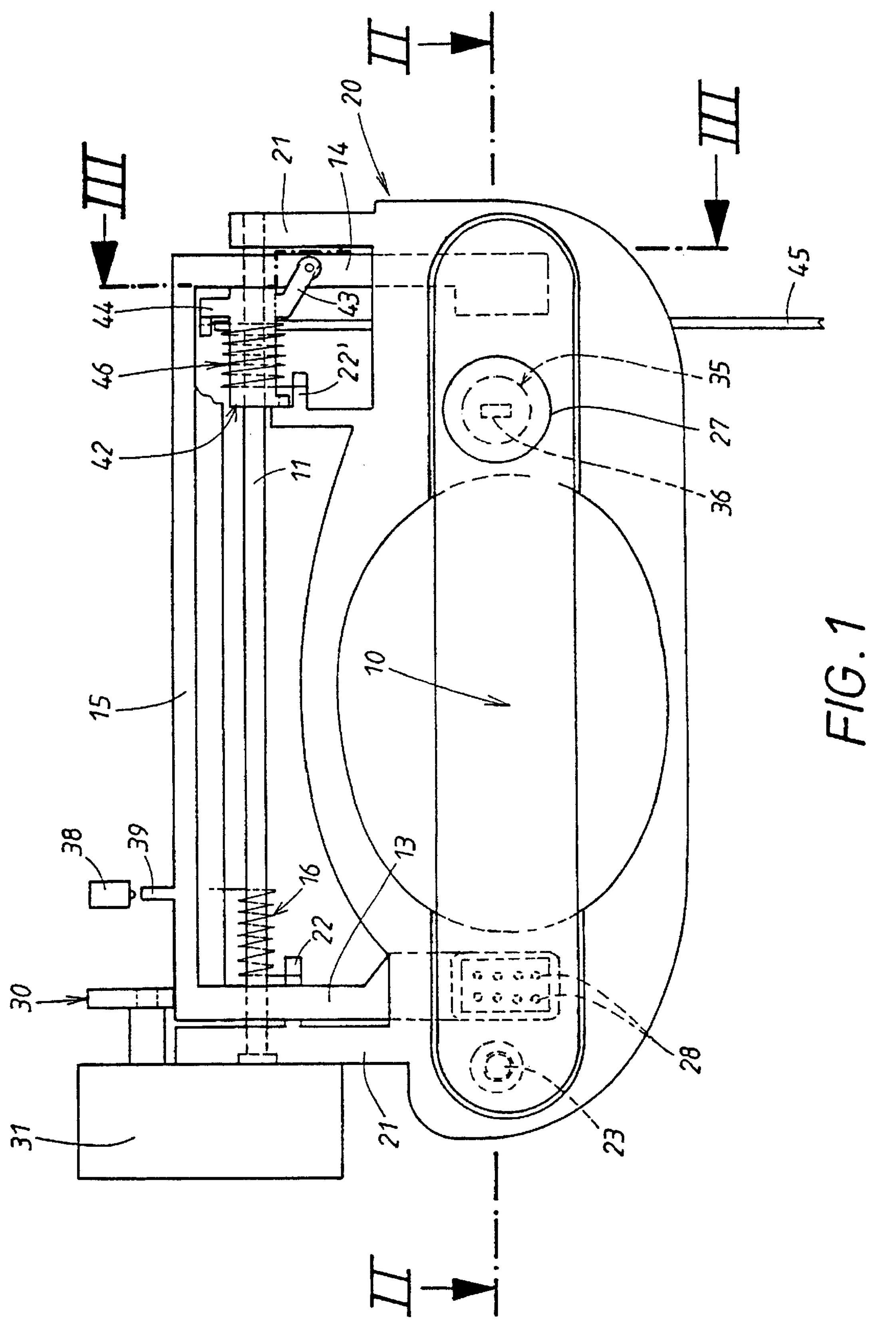
FIG. 1 shows a top view of assembly, including the handle, of the access system according to the invention in the starting position of the components.

Only the most essential parts of the assembly belonging to the access system according to the invention are shown, the most important component of which is a door handle 10. In the exemplary embodiment, the door handle is able to pivot around an essentially horizontal axle 11 in the directions of the arrows 12.1–12.4 in FIGS. 3–6. What is present here, as will be explained in greater detail below, is a pull-flap handle. It is obvious that the handle 10 could also be designed in some other way; for example, it could be a handle which pivots around an essentially vertical axis.

The handle 10 is supported in a housing 20 by an axle 11, which extends between two housing tabs 21. The handle 10 is attached to the axle 11 by two arms 13, 14, which can be connected to each other by a crossbar 15. The handle 10, the arms 13, 14, and the crossbar 15 form a fixed handle linkage. A sidepiece spring 16 is supported by its two sidepieces between a stationary housing part 22 and the handle linkage. The spring 16 exerts a return force on the handle 10; this force thus acts in the direction of the force arrow 17 in FIG. 3.

Figure 2:
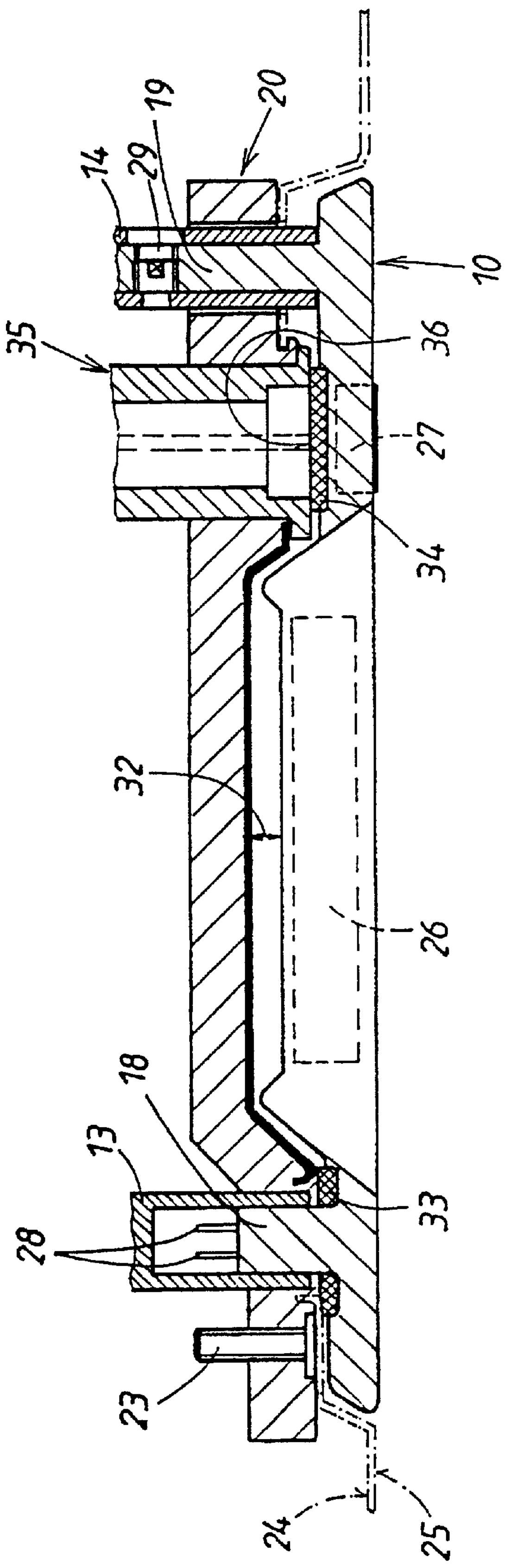
FIG. 2 shows a longitudinal cross section through the assembly shown in FIG. 1 along line II in that figure.

As can be seen in FIG. 2, the two handle arms 13, 14 pass through openings in the housing, which is attached by fastening means 23 to the door, and terminate in an opening in the interior surface 14 of the exterior door panel 25, which opening is merely suggested in broken line. In FIG. 1, the exterior door panel 25 is omitted, so that it is possible to see through to the housing 20. The handle 10 has plug elements 18, 19, by means of which it is connected to corresponding receptacles in the two arms 13, 14. The one plug element 18 comprises electrical contact means 28, which are electrically connected to corresponding counter-contact means (not shown), and lead via electrical lines from the arm 13 to other electrical control means in the vehicle. These electrical control means fulfill certain functions associated with the actuation of the handle, which will be explained in more detail below. These electrical contact means originate from electrical components 26, 27, which are integrated into the handle 10. These components can consist of a capacitor 26 or an antenna, which serves to release the control means leading to the door lock during the access authorization process, and/or a membrane switch 27 in the terminal section of the handle 10, which is intended to lock this control means. The other plug element 19 has a fastening means 29 to establish a mechanical connection between the handle 10 and the handle linkage 13–15. The handle linkage is then able to pivot jointly with the handle 10 in the direction of the arrows 12.1–12.4. It is also advisable to provide a mechanical attachment or latching element in the area of the previously mentioned first plug element 18 on the first arm 13.

Figure 3:
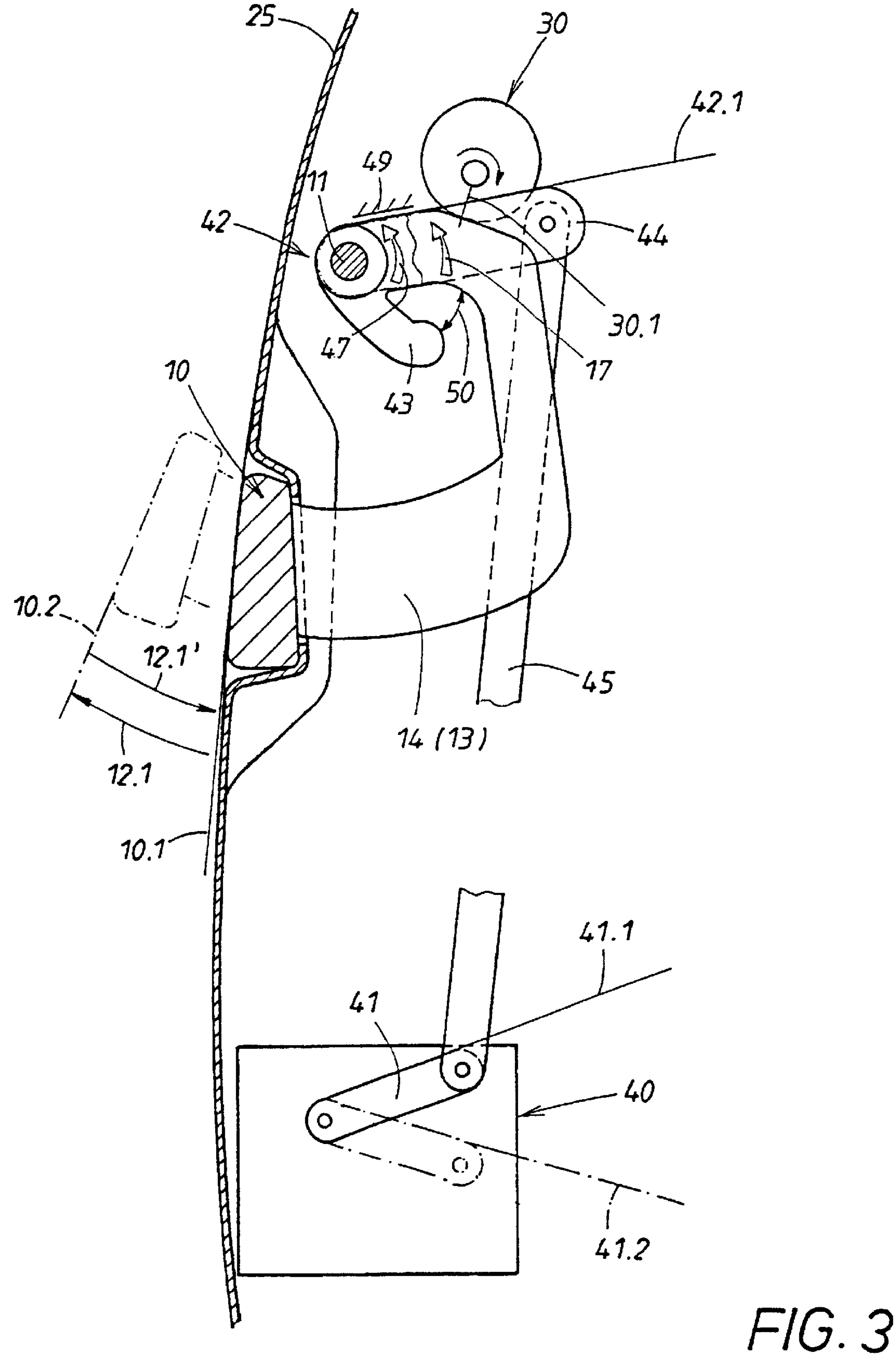
FIG. 3 shows a cross section through the assembly of FIG. 1 along discontinuous line III in that figure, when the components are in their starting positions.

As already mentioned, FIGS. 1–3 show the rest position of the components. As can be seen in FIG. 3, this is characterized in that the handle 10 is completely retracted and conforms ideally to the external contour of the exterior door panel 25. The housing has been left out in FIG. 3, and the arms 13, 14 have been cut away in the area where they are supported on the axle 11. This is also true in the following FIGS. 4–6. The handle 10 is in its first handle position, illustrated by the auxiliary line 10.1 in FIG. 3; this position is called the "retracted" position below. This retracted position 10.1 is determined by a cam 30, which is driven by a motor 31 shown in FIG. 1 and which, when the handle is in the retracted position 10.1, is in its "rest position", characterized in FIG. 3 by the auxiliary line 30.1. In this rest position 30.1, the cam 30 acts with its minimum eccentricity on the arm 13, which coincides with the second arm 14, visible in FIG. 3. In its retracted position 10.1, the handle 10 rests so closely on the exterior door panel 25 that, as can be seen at 32 in FIG. 2, there is no room for the human hand to grip the handle 10.

The handle 10 can be provided on the rear with sealing means 33, 34, which, in the retracted position 10.1, provide a seal against dirt and water both in the area of the contact means 28 shown in FIGS. 1 and 2 and in the area of a lock cylinder 35. Although, in the exemplary embodiment shown, authorization to access the door lock 40 is provided by electronic means, nevertheless, a mechanical key is also provided in the invention for safety reasons so that, in an emergency, e.g., after the electronic circuitry has failed, it is still possible to lock and unlock the door lock 40, the vehicle-side identification means-of which is the lock cylinder 35. In the retracted position 10.1 of the handle 10, the sealing means 34 covers the key insertion opening 36 in the end surface of the lock cylinder 35. As can be seen in FIG. 1, both the lock cylinder 35 and the housing attachment 23 are inaccessible when the handle is in the retracted position, which is also true for the handle attachment 29 behind the panel according to FIG. 2 described above.

Unauthorized persons are denied access to the vehicle by security means and even largely prevented from manipulating the handle. To gain access, the authorized person must use his/her access authorization to implement the measures which are accepted by the identification means in the vehicle. For this purpose, any of the known means can be used in the access system according to the invention. The access authorization means available outside the vehicle can consist of a mechanical key or of an electrical, remote-control key or—in the case of a so-called "keyless entry" system—can be based on a smart card available to the authorized person. In the latter case, the authorized person approaches the vehicle to a within a certain distance from a transponder, which functions as the identification means in the vehicle, and announces his/her intention of entering the vehicle by an additional measure such as by touching the previously mentioned capacitative switch 26 on the handle. The access authorization which has been determined in one or another of these ways causes the identification means to activate the electrical and/or mechanical control means for a door lock.

Figure 4:
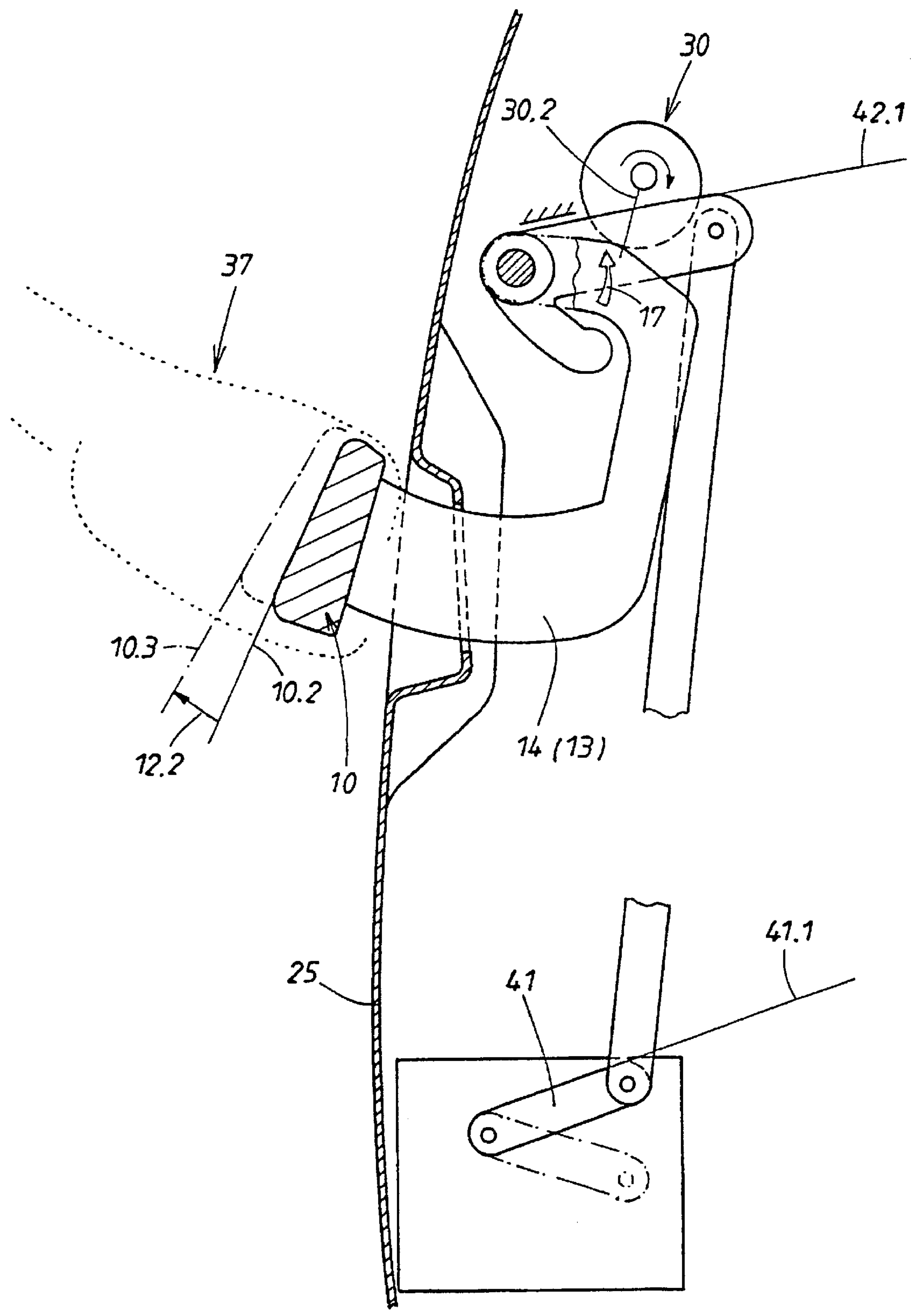
FIGS. 4–6 show schematic diagrams similar to that of FIG. 3 of the same assembly when the components are in their three other possible positions.

One of these control means is a switch (not shown), which switches the previously mentioned motor 31 on so that it moves the cam 30 to its "working position", characterized by the auxiliary line 30.2 in FIG. 4. In this working position 30.2, the maximum eccentricity of the cam acts on the handle arm 13 against its restoring force 17. As a result, the handle 10 arrives in the second handle position characterized by auxiliary line 10.2, which is referred to in the following as the "extended position". During this transition, the handle 10 is forcibly moved as indicated by the arrow 12.1 in FIG. 3.

Another possibility of reaching the extended position 10.2 can consist in that, starting from the retracted position 10.1 according to FIGS. 1–3, a remote-control key is used to unlock the associated electrical control means in the vehicle. It is also advantageous to use certain operating situations of the vehicle as a basis for shifting the handle 10 from its retracted position 10.1 into its extended position 10.2. An especially good example of such a situation is when the vehicle's engine is stopped. This is determined by sensors. The sensors electrically or mechanically cause the handle 10 to move into its extended position 10.2.

Figure 5:
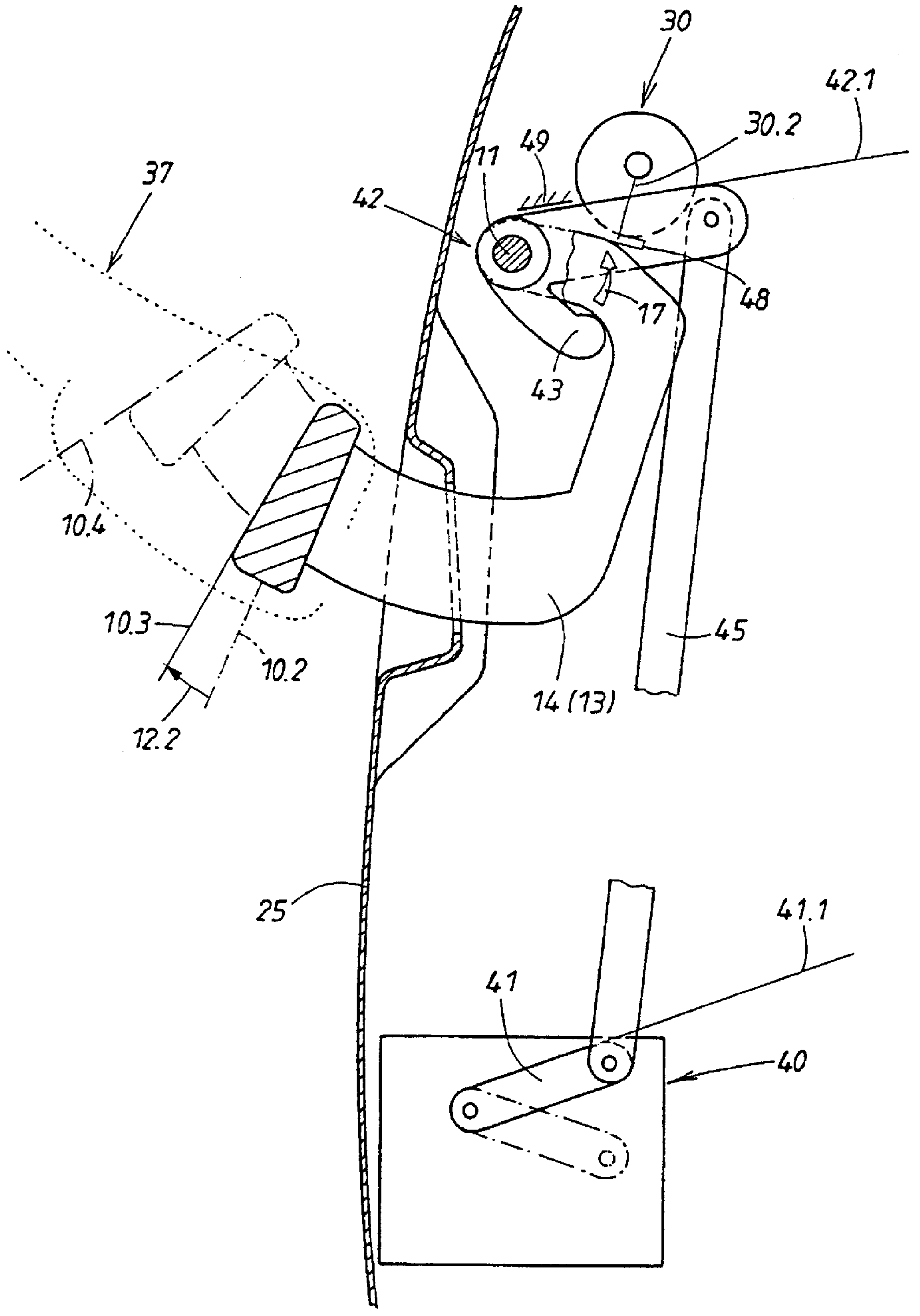

In the extended position 10.2 shown in FIG. 4, the handle 10 can be easily gripped from above and/or from below by a human hand 37 as indicated in dotted line and manually moved in the direction of the pivot arrow 12.2 into a third handle position, shown there in dash-dot line, as indicated by the auxiliary line 10.3. This position 10.3 is shown in FIG. 5 and is to be referred to in the following as the "pulled-out" position. During the pivoting movement 12.2, of course, the handle linkage 13–15 connected to the handle pivots along with it. The cam 3.0, however, remains in its working position 30.2. The actuating element of a microswitch 38, shown in FIG. 1, projects into the path of the pivoting movement 12.2 of the handle linkage. The actuating element can cooperate with, for example, a control surface 39 on the previously mentioned crossbar 15. This microswitch 38 is a component of the electrical control means, which acts on the door lock 40, indicated schematically in FIGS. 3–6. The control means can act on a lock motor provided in the door lock 40 and move the door lock 40 into the position which releases the door. Now the door can be opened. In the pulled-out position 10.3, as can be seen in FIG. 5, the handle arm 13 of the handle linkage is lifted against the action of the handle restoring force 17 from the resting cam 30, as can be concluded from the existence of the gap 48. The previously mentioned path of the pivoting motion 12.2 can be relatively short, i.e., on the order of 5 millimeters.

After the door has been opened and the handle 10, gripped in FIG. 5, has been let go, the handle moves automatically back again because of the handle restoring force 17 already mentioned several times and thus returns to the preceding extended position 10.2 according to FIG. 4. The handle remains in this extended position 10.2 when the door is shut again and the mechanical lock system of the door lock 40 is mechanically or electrically returned to its locked position. In the second, i.e., extended, position 10.2, the handle arm 14 is positively supported on the cam 30, where the cam is in its position of maximum eccentricity. The door can thus be shut by pushing on the extended handle 10.2. The starting situation with the handle 10 in the retracted position 10.1 according to FIGS. 1–3 can then be reached again in various ways, which depend not only on the type of selected access authorization but also on the operational state of the vehicle.

If the authorized person is in the vehicle and if he/she starts the engine, sensors ensure that, as soon as the vehicle reaches a certain speed, such as 5 km per hour, all handles 10 are automatically moved from the extended position 10.2 into their retracted position 10.1. The lowering of the door handle 10 in the direction of the arrow 12.1' of FIG. 3 is accomplished by the activation of a switch, which causes the cam motor 31 either to continue turning in the same direction or to turn in the opposite direction until the cam 30 has returned from its working position 30.2 of FIG. 4 to its rest position 30.1 of FIG. 3. The handle restoring force 17 ensures that, when the cam 30 turns, the return movement of the handle linkage is damped. The handle 10 reaches its retracted position 10.1 with practically no noise. An automatic reversal of the control means serving to open the door lock, i.e., the automatic return of the control means to its inoperative position, can also be associated with this movement of the handle.

If, while the vehicle is stopped, it is desired to lower the handle from its extended position 10.2 in the direction of arrow 12.1' from the outside, the actuating commands specified for the selected access system must be given. In the present case, the above-described membrane switch 27 in the handle 10 can be used for this purpose. When this is actuated, the previously described rotation of the cam 30 occurs, and the vehicle is secured by the deactivation of the control means acting on the door lock. Another possibility would be to actuate an electronic remote-control key, which acts on the cam motor 31 by way of the identification means in the vehicle communicating with it to move the cam 30 in the manner previously explained. Here, too, after the handle 10 reaches its retracted position 10.1, the control means which actuates the lock 40 is rendered inoperative again; the vehicle is secured.

The access system according to the invention remains functional even if the previously described electronic circuitry fails. There is, namely, a fourth handle position of the handle, illustrated by the auxiliary line 10.4 in FIGS. 5 and 6, which is reached by the manual pivoting of the handle 10 in the direction of the pivot arrow 12.3 in FIG. 6. In this fourth position 10.4, the door lock 40 is mechanically unlocked and mechanically opened. Because this occurs only in an emergency in the present exemplary embodiment, this fourth handle position 10.4 is referred to as the "final position".

Figure 6:
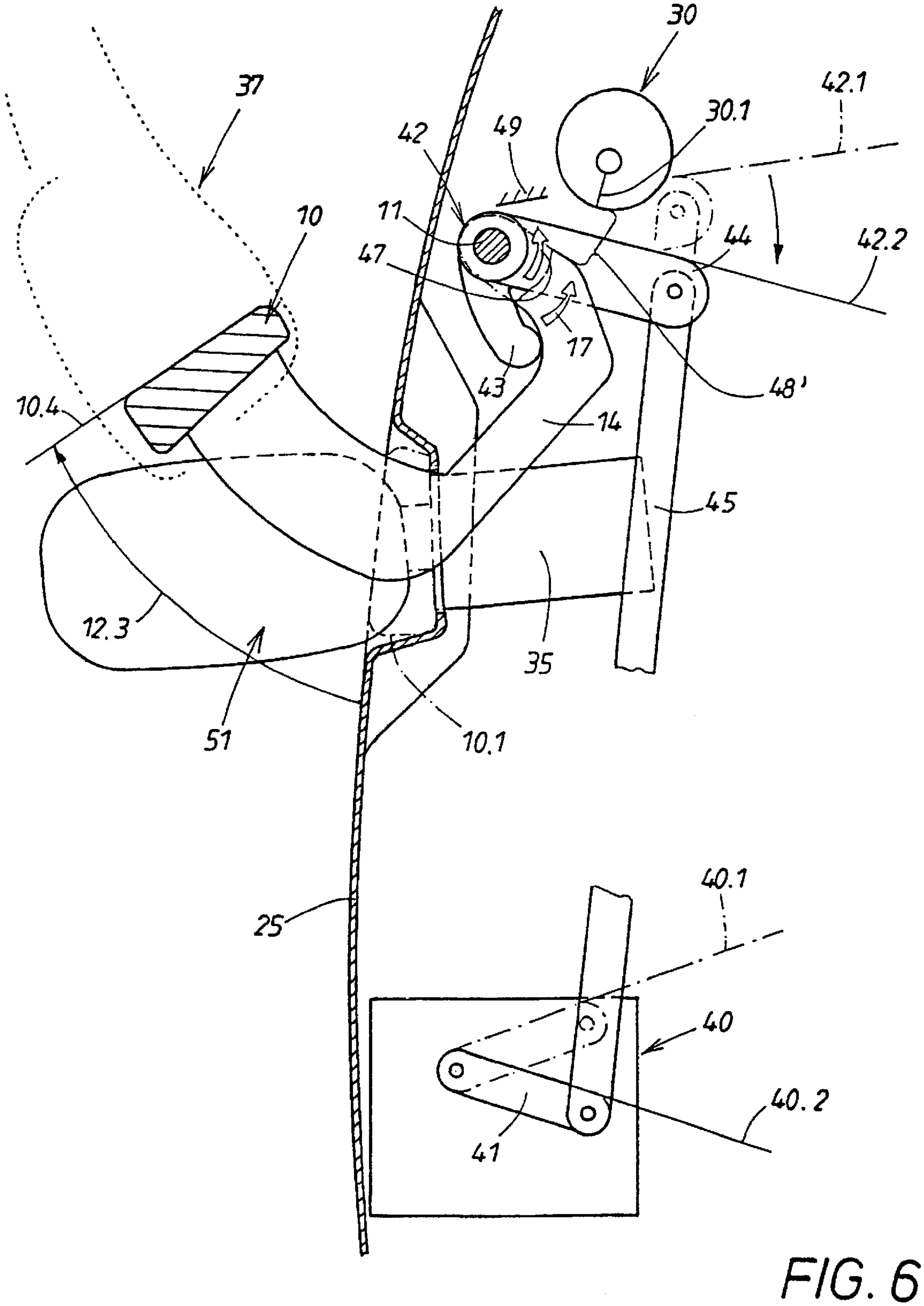

The way in which this final position 10.4 works is illustrated in FIG. 6. The end surface of the lock cylinder is now accessible. A mechanical key 51 can be inserted, and the door lock 40 can be opened by turning the key. In this final position 10.4, of course, the door lock 40 can also be locked by the key 51. A lever 42 supported on the axle 11 was not actuated in the previous positions 10.1–10.3 and was in the rest position, characterized by the auxiliary line 42.1. In this rest position, an angular gap 30, shown in FIG. 3, was present at all times between a control arm belonging to the lever 42 and the handle linkage. This does not change until the final position 10.4 is reached.

The lever 42 is supported on the axle 11 and is designed here with two arms 43, 44. A sidepiece spring 46, shown in FIG. 1, acts on the lever 42. One end of the spring 46 grips under a fixed housing part 22', whereas the other end of the spring exerts force on the lever 42 in the direction of the arrow 47 of FIG. 3, so that this normally rests against a rotational end stop 49 on the housing and produces the previously mentioned rest position 42.1 of the lever 42. This rest position 42.1 is, as previously mentioned, present in the three previously described handle positions according to FIGS. 3 and 4. The reason for this is that the lever 42, with its control arm 43, which allows it to be pivoted, is normally separated from the handle arm 14 cooperating with it by the previously cited gap 50. In the fourth handle position 10.3 of FIG. 5, i.e., the pulled-out position 10.3, the most that can happen is the occurrence of contact between the handle arm 14 and the control arm 43 of the lever 32. The lever 42, however, has not been moved yet.

If the electronic circuitry in the vehicle fails, it is nevertheless still possible in the invention to open the door lock 40. Starting from the retracted position 10.1, the door handle 10 is moved in the direction of the arrow 12.3 to the final position 10.4. Over the last part of this distance, the handle arm 14 strikes the control arm 43 and carries the lever 42 into the switch position characterized by an auxiliary line 42.2. A rod 45, which is connected to the arm 41 on the door lock 40, is seated on the other arm 44 of the lever 42. This lock arm 41 is normally located, in analogy to the lever 42, in a rest position characterized by an auxiliary line 41.1, in which the door lock is mechanically unaffected and can be moved into its open position by a lock motor upon the preceding electrical activation, as previously described. After the actuating arm 44 of the lever has pivoted into the switch position 42.2, the lock arm 41, however, is moved to its open position, illustrated by the auxiliary line 41.2 in FIG. 6, which opens the door lock 40 by mechanical means.

During this pivoting movement of the lever 42, the previously described cam motor 31 remains at rest. In FIG. 6, in the third or final position 10.4, the cam 30 remains unchanged in its rest position 30.1, as shown in FIG. 3. The cam 30 is acting here with its minimum eccentricity 30.1. During the pivoting 12.3 of FIG. 6, an especially large open gap 48' is therefore created between the handle arm 14 and the cam 30, which has no influence on the switch position 42.2 of the lever 42. The pivoting movement of the lever 42 occurs against the action of the spring-loading 47, which, for the following reasons, should be considerably stronger than the handle restoring force 17.

The difference in force between 47 and 17 is obtained through the use of springs 46, 16 with different spring constants. This obviously has an effect-on the manual pivoting movements 10.2 and 10.3 of the door handle 10.

Normally, when the electronic system is functioning, only the handle actuation illustrated by the motion arrow 1.2 in FIG. 4 takes place, which must occur merely in opposition to the handle restoring force 17, in order to move the door handle 10 into the pulled-out position 10.3 shown in FIG. 5. As already emphasized, up until this point the lever force 47 has not yet become operative. This does not occur until, as already mentioned, the manual pivoting movement occurs in the direction of the arrow 12.3 of FIG. 6. The much stronger lever load 47 then becoming operative now acts as a "torque barrier" during the normal actuation of the handle. The human hand 37 detects a "stop signal" after reaching the pulled-out position 10.3 as a result of the spring resistance which theft occurs. The person actuating the handle 10 is thus informed that he has properly covered the manual actuating distance 12.2. If needed, this torque barrier could be reinforced by latching elements between the handle linkage and the housing 20. The greater expenditure of force 47' during the manual pivoting 12.3 of the door handle 10 does not have a negative effect on the ease with which the handle 10 can be operated, because, as mentioned, the final position 10.4 is aimed for only in exceptional circumstances, namely, only in an "emergency".

The latter, however, will be modified when the previously described access system is not intended to act on the door lock 40 by means of electrical or electronic control means but rather exclusively by mechanical control means. The assembly of the access system according to the invention shown in the exemplary embodiment can be used in this case, too. The design and function of most of the components can remain unchanged, which means that a wide field of application becomes open to the access system according to the invention for electrical, for mechanical, and for the previously described combined electromechanical control means. A completely manual pivoting into the third handle position 10.4 of FIG. 6 is now required, whereas the previously described fourth handle position 10.3 can be omitted. Otherwise, the effects already described remain the same. Because the omission of the third handle position 10.2 eliminates the need for a clearly detectable torque threshold, it will be possible to reduce the elastic force 47 acting on the lever 42 in comparison with that used in the preceding exemplary embodiment. That is, this force is acting even in the normal case when the handle is being moved between the position of FIG. 4 and that of FIG. 6. This mechanical solution thus also has three different handle positions, namely, 10.1, 10.2, and 10.4.

It is of independent inventive significance to give the door handle 10 the new function of being a covering means for the end surface of a lock cylinder, which is installed in the vehicle as identification means. That has already been explained in detail at the beginning of the special description.

List of Reference Numbers

10 door handle
10.1 first handle position, retracted position
10.2 second handle position, extended position
10.3 fourth handle position, pulled-out position
10.4 third handle position, final position 11 axle of 10
12.1 arrow of forcible pivoting-open movement between 10.1 and 10.2
12.1' arrow of the forcible pivoting-closed movement between 10.2 and 10.1
12.2 arrow of the manual pivoting movement between 10.1 and 10.3
12.3 arrow of the full manual pivoting movement of 10 between 10.1 and 10.4 (FIG. 6)
13 first handle arm of 10, handle linkage
14 second handle arm of 10, handle linkage
15 crossbar between 13 and 14, handle linkage
16 sidepiece spring for 10
17 handle restoring force of 10
18 plug element on 10 for 13
19 plug element on 10 for 14
20 housing
21 bearing tab on 20 for 11
22 fixed housing parts for 16
22' fixed housing parts for 46
23 fastening means for 20
24 inside surface of 25 (FIG. 2)
25 exterior door panel (FIG. 2)
26 electric component, capacitative switch
27 electric component, membrane switch
28 electrical contact means at 18 (FIG. 2)
29 handle fastening means at 19 (FIG. 2)
30 cam
30.1 rest position of 30
30.2 working position of 30
31 motor, electrical control means
32 residual gap between 10 and 20 (FIG. 2)
33 sealing means at 18 (FIG. 2)
34 sealing means at 35 (FIG. 2)
35 lock cylinder (FIGS. 1, 2)
36 key insertion opening (FIGS. 1, 2)
37 human hand
38 microswitch (FIG. 1)
39 control surface on 15 for 38
40 door lock
41 lock arm
41.1 rest position of 41
41.2 open position of 41
42 lever
42.1 rest position of 42
42.2 switch position of 42 (FIG. 6)
43 control arm of 42
44 actuating arm of 42
45 rod between 44 and 41
46 sidepiece spring 42
47 lever force, spring-loading of 42 by 46
48 gap between 30 and 14 (FIG. 5)
48' large gap between 30 and 14 (FIG. 6)
48 open gap between 30 and 14 (FIG. 5)
49 rotational stop for 42 on 20
50 angular gap between 43 and 14 (FIG. 3)
51 mechanical key (FIG. 6)

What is claimed is:

1. Access system for a vehicle with at least one door, in which an identification means installed in the vehicle responds to an access authorization available outside the vehicle;

where, when the identification means responds, electrical and/or mechanical control means moves a door lock out of an inoperative position into an operative position;

with a door handle (10), which can be moved at least between three different positions (10.1, 10.2, 10.3) with respect to the door;

where the door handle (10) is initially in a first position, namely, an essentially lowered, retracted position in the exterior door panel (25), in which the door lock (40) is locked and the door handle (10) cannot be gripped at all or only insufficiently by the human hand (37);

and the door handle (10), furthermore—if the identification means responds to the access authorization—is moved from this retracted position (10.1) into a second, extended position (10.2) projecting from the door, in which position the door lock (40) is still locked but the handle (10) can be properly gripped by the human hand (37);

and the door handle (10) can be moved manually into a third or final position (10.4), in which the door lock (40) is opened by electrical and/or mechanical control means (42, 45, 41);

with a controllable actuator (30), which can be rotated electrically between a rest position (30.1) and a working position (30.2), which actuator shifts the door handle (10) between its first or retracted position (10.1) and its second or extended position (10.2);

and with a restoring force (17), which pushes the door handle (10) or a linkage (13–15) of the door handle into the first or retracted position (10.1), wherein the actuator is a cam (30), on which the door handle (10) or the linkage (13–15) is always supported nonpositively as a result of the restoring force (17), either on the point of minimum eccentricity when the cam is in its rest position (30.1) or on the point of maximum eccentricity when the cam is in the working position (30.2), but which, in the case of a door lock (40) controlled by a lock motor, allows the door handle (10) or the linkage (13–15) to be lifted manually away from the point of maximum eccentricity and defines a fourth or pulled-out position (10.3) of the door handle (10), which is between the second or extended position (10.2) and the third or final position (10.4) and in which the lock motor is rendered operative; and in that in an access system without a lock motor or in an emergency such as when the electronic circuitry fails the fourth or pulled-out position (10.3) is omitted, and the door handle (10) or it-s the linkage (13–15) is lifted manually away from the point of maximum or minimum eccentricity (48') and moved into its third or final position (10.4).

2. Access system according to claim 1, wherein the electrical control means comprises a switch (38) and a lock motor on the door lock (40), where the contactor of the switch (38) is located in the path of manual movement of the door handle (10) or the linkage (13–15) between its second or extended position (10.2) and the third or pulled-out position (10.3); and in that the switch (38) responding to the manual movement (12.2) of the handle renders the lock motor operative and opens the door lock (40) by means of the motor.

3. Access system according to claim 1, wherein the mechanical control means comprises a lever (42), which acts on the linkage (13–15), which lever is spring-loaded (47), normally rests against an end stop (49), and is held by an arm (43) a certain angular distance (50) away from the handle linkage (13–15), where this angular distance (50) is greater than or equal to the path along which the handle linkage (13–15) travels between the first or retracted position (10.1) and the third or pulled-out position (10.3) of the handle (10).

4. Access system according to claim 3, wherein the spring-loading (47) acting on the lever (42) is stronger than the restoring force (17) acting beforehand on the door handle (10), and in that, when the handle is actuated, the point at which the effect of the lever spring-loading (47) begins produces a perceptible force threshold, which acts as a limit on the third or pulled-out position (10.3) of the handle (10).

5. Access system according to claim 3, wherein the handle (10) is supported by two terminal arms (13, 14) on an axle (11) so that it can move like a flap, and in that this axle (11) serves simultaneously to support the lever (42).

6. Access system according to claim 3, wherein the handle restoring force (17) and the lever spring-loading (47) are provided by two sidepiece springs (16, 46) with different spring constants, these springs having several turns, and in that the turns of the two sidepiece springs (16, 46) pass coaxially around the axle (11) serving to support the handle (10).

7. Access system according to claim 1, wherein access authorization for the door lock (40) occurs by way of a mechanical key, to which a lock cylinder (35) is assigned as identification means for the door lock (40) inside the vehicle; in that the end surface of the lock cylinder (35) with the insertion opening (36) for the key is covered by the door handle (10) when the handle is in its retracted position (10.1); and in that the key insertion opening (36) is not accessible for the insertion and rotation of the key for the locking or unlocking of the door lock until after the door handle (10) has been pulled out completely in the final position (10.4).

8. Access system according to claim 7, wherein the door handle (10) is provided on the rear with a sealing means (34), which, when the handle is in the retracted posit(ion (10.1), rests with a sealing effect on the end surface of the lock cylinder (35).

9. Access system according to claim 1, wherein in the case of a keyless entry system, the person authorized for access must first bring his/her access authorization identification, such as a smart card, to within a certain defined communications distance from the identification means in the vehicle; and in that the person authorized for access must then inform the identification means of his/her intention to access the lock by a certain action such as touching the handle, whereupon the handle (10) is moved from its first or retracted position (10.1) into its second or extended position (10.2).

10. Access system according to claim 1, wherein in the case of an automobile, the inoperative state of the automobile engine automatically moves the door handle (10) from the first or retracted position (10.1) into the second or extended position (10.2).

11. Access system according to claim 1, wherein in the case of an access authorization system working with an electronic remote-control key, the door handle (10) is moved (12.1) automatically from its first or retracted position (10.1) to its second or extended position (10.2) when the remote-control key is actuated in the unlocking direction, and in that the door handle (10) is moved by a motor in the opposite direction (12.1') from its second or extended position (10.2) to its first or retracted position (10.1) when the remote-control key is actuated in the locking direction.

12. Access system according to claim 1, wherein in the case of an automobile, the door handle (10) is moved by a motor back from its second or extended position (10.2) into its first or retracted position (10.1) when the engine of the automobile is started and/or when sensors responding to a certain speed limit detect that the automobile is traveling faster than this limit.

13. Access system according to claim 1, wherein the door handle (10) is moved by a motor back from its second or extended position (10.2) to its first or retracted position (10.1) when sensors (27) in the vehicle are activated.

14. Access system according to claim 13, wherein the sensor (27) is integrated into the door handle (10) and can be actuated manually.

15. Access system according to claim 11, wherein by returning the actuator or turning back the cam (30) from its working position (30.2) into its rest position (30.1), the door handle (10), which is initially in its second or extended position (10.2), is lowered in a damped manner into its first or retracted position (10.1).

* * * * *